US010205384B2

(12) United States Patent
Lethellier et al.

(10) Patent No.: US 10,205,384 B2
(45) Date of Patent: Feb. 12, 2019

(54) RESONANT AC-TO-DC CONVERTER

(71) Applicant: Wireless Advanced Vehicle Electrification, Inc., Salt Lake City, UT (US)

(72) Inventors: Patrice Lethellier, Salt Lake City, UT (US); Marcellus Harper, Kaysville, UT (US); Ryan Calder, Saratoga Springs, UT (US)

(73) Assignee: Wireless Advanced Vehicle Electrification, Inc., Salt Lake City, UT (US)

( * ) Notice: Subject to any disclaimer, the term of this patent is extended or adjusted under 35 U.S.C. 154(b) by 0 days.

(21) Appl. No.: 16/011,524

(22) Filed: Jun. 18, 2018

(65) Prior Publication Data

US 2018/0367030 A1 Dec. 20, 2018

Related U.S. Application Data

(60) Provisional application No. 62/521,145, filed on Jun. 16, 2017.

(51) Int. Cl.
*H02M 1/42* (2007.01)
*H02M 7/06* (2006.01)
(Continued)

(52) U.S. Cl.
CPC ........... *H02M 1/4241* (2013.01); *H02J 50/10* (2016.02); *H02J 50/70* (2016.02); *H02M 1/14* (2013.01);
(Continued)

(58) Field of Classification Search
CPC ............. H02M 1/4241; H02M 1/4258; H02M 2001/0058; H02M 1/42; H02M 1/4216;
(Continued)

(56) References Cited

U.S. PATENT DOCUMENTS 5,978,242 A * 11/1999 Raad ................... H02M 3/1563
363/125
2010/0080028 A1 4/2010 Cheng et al.
(Continued)

FOREIGN PATENT DOCUMENTS

RU 99667 11/2010
SU 736298 5/1980

OTHER PUBLICATIONS

AJShKSEEV O.V. and others. EJST-TECH Devices. Moscow, ENERGOIZDAT, 1981, p. 22, fig2.5 (a).
(Continued)

*Primary Examiner* — Gary L Laxton
(74) *Attorney, Agent, or Firm* — Kunzler, PC; Bruce R. Needham (57) ABSTRACT

A resonant AC-to-DC converter apparatus includes an inductance circuit comprising an inductor with a first and connected in series with each phase of an AC power source comprising a fundamental frequency, and a capacitance circuit that includes a capacitance for each phase. Each capacitance is connected between a second end of the inductor of a phase and a neutral connection, and the capacitance and the inductor of the connected phase form a resonant frequency. The apparatus includes a rectification circuit with an input and an output, the input connected, for each phase, in series with the second end of the inductor of the phase. The resonant frequency is related to the fundamental frequency to provide a gain at the fundamental frequency, the gain boosting a voltage of the input to the rectification circuit at the fundamental frequency above an output voltage of the AC source.

22 Claims, 7 Drawing Sheets

(51) Int. Cl.
  *H02M 1/14* (2006.01)
  *H02M 3/335* (2006.01)
  *H02J 50/10* (2016.01)
  *H02M 7/217* (2006.01)
  *H02J 50/70* (2016.01)
  *G05F 1/70* (2006.01)
(52) U.S. Cl.
  CPC ..... *H02M 1/4258* (2013.01); *H02M 3/33507* (2013.01); *H02M 3/33569* (2013.01); *H02M 7/217* (2013.01)
(58) Field of Classification Search
  CPC .......... H02M 7/06; H02M 7/066; H02J 50/12; H02J 50/70; G05F 1/70
  See application file for complete search history.

(56) References Cited

U.S. PATENT DOCUMENTS

| | | | | |
|---|---|---|---|---|
| 2013/0272044 A1* | 10/2013 | Boys | ................ | H02J 5/005 363/126 |
| 2015/0263640 A1* | 9/2015 | Russell | ................ | H02M 7/06 363/126 |

OTHER PUBLICATIONS

Morozov A.G. Ejschtrotechnika, Ejstkronika and Pulse Technology. Moscow, "High School", 1987, p. 200 paragraph 4, machine translation of paragraph of included.

PCT Application No. PCT/US2018/038125, filed Jun. 18, 2018, International Search Report dated Oct. 4, 2018.

* cited by examiner

FIG. 6

RESONANT AC-TO-DC CONVERTER

CROSS-REFERENCES TO RELATED APPLICATIONS

This application claims the benefit of U.S. Provisional Patent Application No. 62/521,145 entitled "RESONANT AC-TO-DC CONVERTER" filed on Jun. 16, 2017 for Patrice Lethellier, which is incorporated by reference herein for all purposes.

FIELD

This invention relates to power supplies and more particularly relates to a resonant AC-to-DC converter power supply.

BACKGROUND

While utilities provide alternating current ("AC") power, most electronics require direct current ("DC") power. With the increase in electronics, even for loads once driven by AC power, electrical loads that require conversion of AC to DC power have increased dramatically. Harmonics from electrical loads with AC-to-DC converters causes issues for electrical utilities. Reducing inefficient power conversion is also paramount for conservation of natural resources as well as reduction of cooling requirements and reduction of power costs.

Early AC-to-DC converters and DC-to-DC converters used linear components and were highly inefficient. Switch-mode converters have become very popular and numerous techniques have been employed to reduce switching loses. However, switching loses and reliability of switching components continue to be a concern for AC-to-DC converters and other converters that transform electrical power.

SUMMARY

A resonant AC-to-DC converter apparatus includes an inductance circuit that includes an inductor with a first end connected in series with each phase of an alternating current ("AC") power source with a fundamental frequency. The apparatus includes a capacitance circuit with a capacitance for each phase. Each capacitance is connected in parallel between a second end of the inductor of a phase and a neutral connection. The capacitance and the inductor of the connected phase form a resonant frequency. The apparatus includes a rectification circuit with an input and an output. The input is connected, for each phase, in series with the second end of the inductor of the phase. The resonant frequency is related to the fundamental frequency to provide a gain at the fundamental frequency. The gain boosts a voltage of the input to the rectification circuit at the fundamental frequency above an output voltage of the AC source.

In some embodiments, the inductance circuit includes a transformer with a primary side connected to each phase of the AC power source. The transformer includes a leakage inductance for each phase. The capacitance circuit is connected between a secondary of the transformer and the neutral connection of the secondary of the transformer and the gain at the resonant frequency boosts the secondary voltage of the transformer at the fundamental frequency above a secondary voltage of the transformer resulting from a turns ratio of the transformer. In other embodiments, the leakage inductance includes a leakage inductance of the transformer and/or an inductance in series with each phase, where a design of each transformer is chosen to achieve a desired amount of leakage inductance of the transformer. In other embodiments, the apparatus includes a magnetizing inductance of the transformer. The magnetizing inductance is manifest as an inductance for each phase of the transformer connected between each phase of a primary side of the transformer and a neutral of the primary of the transformer. A design of the transformer is chosen to achieve a desired amount of magnetizing inductance of the transformer to achieve a power factor. In other embodiments, the apparatus includes a power factor capacitor for each phase of the transformer connected between each phase of a primary side of the transformer and a neutral of the primary of the transformer, where each power factor capacitor is chosen to achieve a desired power factor. In other embodiments, the transformer is a three-phase, wye-wye connected transformer. In other embodiments, the transformer is three single-phase transformers connected to a common neutral, the common neutral comprising the neutral connection.

In some embodiments, the capacitance circuit includes a variable capacitance for each phase where varying the capacitances of the capacitance circuit adjusts the gain of the input voltage of the rectification circuit at the fundamental frequency. In other embodiments, the capacitance circuit includes a plurality of capacitors for each phase and the capacitance circuit varies the capacitance by connecting and disconnecting one or more capacitors of the plurality of capacitors of a phase. Each connected capacitor is connected between the second end of the inductor of a phase and the neutral connection of the secondary. In other embodiments, each capacitor includes a switch connected in series with the capacitor and each switch is controllable to connect and disconnect the capacitor.

In other embodiments, each switch includes a zero-voltage detection circuit. When a switch is commanded closed, the switch closes in response to the zero-voltage detection circuit indicating a zero voltage. In other embodiments, the switch includes a solid-state relay with a zero-voltage detection circuit. In other embodiments, the apparatus includes a direct current ("DC") bus controller that senses a DC output voltage of the rectification circuit and controls the DC output voltage to a setpoint value by connecting and disconnecting one or more capacitors of the capacitance circuit. In other embodiments, the plurality of capacitors includes a plurality of sizes of capacitors. In some embodiments, the resonant frequency is a frequency above the fundamental frequency and adjusting capacitance of the capacitance circuit varies the resonant frequency such that a gain at the fundamental frequency changes as the resonant frequency changes.

Another resonant AC-to-DC apparatus includes an inductance circuit with an inductor connected in series with each phase of an AC power source with a fundamental frequency. The apparatus includes a capacitance circuit with a variable capacitance for each phase. Each capacitance is connected in parallel between a second end of the inductor of a phase and a neutral connection. The capacitance and the inductor of the connected phase form a resonant frequency where varying the capacitances of the capacitance circuit adjusts the gain of the secondary voltage at the fundamental frequency. The apparatus includes a rectification circuit with an input and an output. The input is connected, for each phase, in series with the second end of the inductor of the phase. The resonant frequency is above the fundamental frequency and provides a gain at the fundamental frequency. The gain boosting a voltage of the input to the rectification circuit at the fundamental frequency above an output voltage of the AC source. Adjusting capacitance of the capacitance circuit varies the resonant frequency such that a gain at the fundamental frequency changes as the resonant frequency changes.

In some embodiments, the capacitance circuit includes a plurality of capacitors for each phase and the capacitance circuit varies the capacitance by connecting and disconnecting one or more capacitors of the plurality of capacitors of a phase. Each connected capacitor is connected in parallel between a second end of the inductor of a phase and the neutral connection. In other embodiments, each capacitor includes a switch connected in series with the capacitor and each switch is controllable to connect and disconnect the capacitor. In other embodiments, each switch includes a zero-voltage detection circuit. When a switch is commanded closed, the switch closes in response to the zero-voltage detection circuit indicating a zero voltage.

In other embodiments, the inductance circuit includes a transformer with a primary side connected to each phase of the AC power source. The transformer includes a leakage inductance for each phase. The capacitance circuit is connected between a secondary of the transformer and the neutral connection of the secondary of the transformer and the gain at the resonant frequency boosts the secondary voltage of the transformer at the fundamental frequency above a secondary voltage of the transformer resulting from a turns ratio of the transformer. In other embodiments, the apparatus includes a magnetizing inductance of the transformer. The magnetizing inductance is manifest as an inductance for each phase of the transformer connected between each phase of a primary side of the transformer and a neutral of the primary of the transformer. A design of the transformer is chosen to achieve a desired amount of magnetizing inductance of the transformer to achieve a power factor. In other embodiments, the apparatus includes a power factor capacitor for each phase of the transformer connected between each phase of a primary side of the transformer and a neutral of the primary of the transformer, each power factor capacitor chosen to achieve a desired power factor.

Another AC-to-DC converter apparatus includes a transformer with a primary connected to an AC power source with a fundamental frequency. Each phase of the transformer includes an inductance that includes a leakage inductance of the transformer and/or a series inductance in series with each phase. The apparatus includes a capacitance circuit with a plurality of capacitors and switches for each phase of the transformer, where each capacitor is connected in series with a switch and each capacitor and series switch is connected between a phase and a neutral connection of a secondary of the transformer. Capacitance of connected capacitors of a phase and the inductance of the phase form a resonant frequency, where varying the capacitances of the capacitance circuit adjusts the gain of the secondary voltage at the fundamental frequency. Each switch includes a zero-voltage detection circuit and when a switch is commanded closed, the switch closes in response to the zero-voltage detection circuit indicating a zero voltage. The apparatus includes a rectification circuit connected to each phase of the secondary of the transformer, and a DC bus controller that senses a DC output voltage of the rectification circuit and controls the DC output voltage to a setpoint value by connecting and disconnecting one or more capacitors of the capacitance circuit.

In the embodiment, the resonant frequency is above the fundamental frequency and provides a gain at the fundamental frequency. The gain boosts a secondary voltage of the transformer at the fundamental frequency above a secondary voltage resulting from a turns ratio of the transformer and adjusting capacitance of the capacitance circuit varies the resonant frequency such that a gain at the fundamental frequency changes as the resonant frequency changes.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
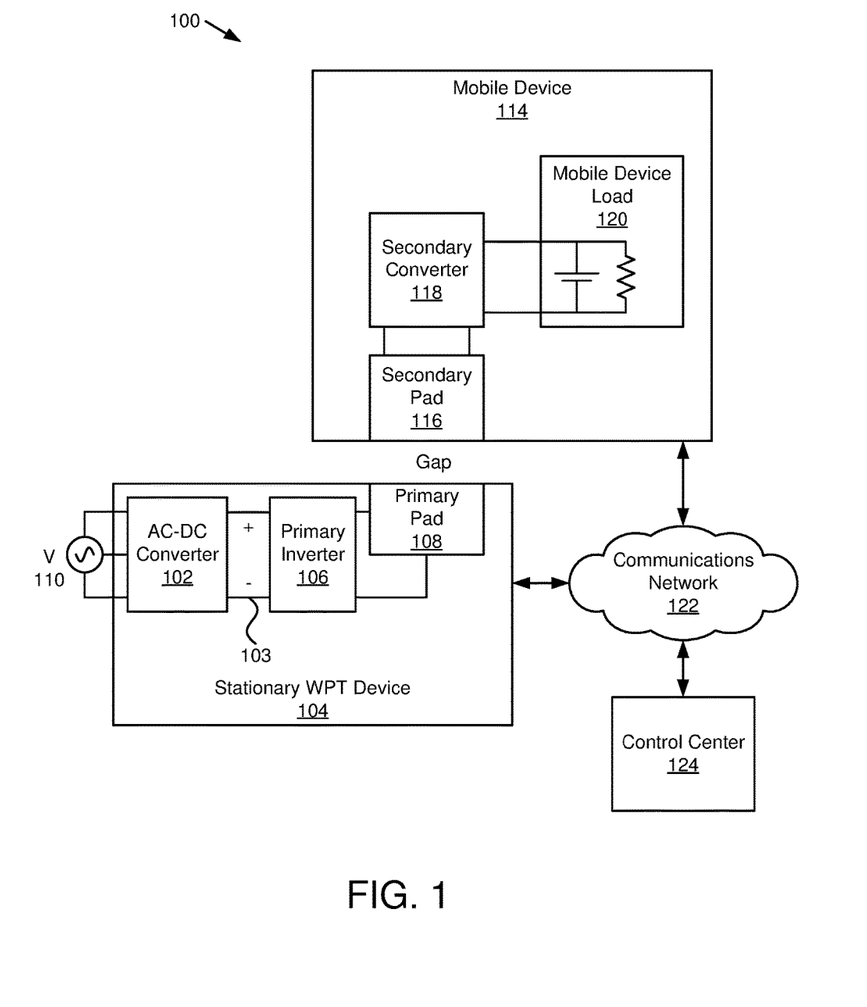
FIG. 1 is a schematic block diagram illustrating one embodiment of a system with a resonant alternating current ("AC") to direct current ("DC") converter.

FIG. 1 is a schematic block diagram illustrating one embodiment of a system 100 with a resonant AC-to-DC converter 102. The system 100 includes a stationary wireless power transfer ("WPT") device 104 with a resonant AC-to-DC converter 102, a DC bus 103, a primary inverter 106, and a primary pad 108, an alternating current ("AC") power source 110, which may be a three-phase AC power source, a mobile device 114 with a secondary pad 116, a secondary converter 118 and a mobile device load 120, a communication network 122, and a control center 124, which are described below. While the resonant AC-to-DC converter 102 is depicted in a WPT system 100, the resonant AC-to-DC converter 102 may be used to provide power to other loads, such as a computing system, a motor, a battery, etc. and may be used for conductive charging, welding, electroplating, uninterruptable power supplies, and DC distribution systems, to name a few.

The system 100, in one embodiment, includes a stationary WPT device 104 that includes a resonant AC-to-DC converter 102. The resonant AC-to-DC converter 102 is connected to an AC power source 110, which is a three-phase source in the depicted embodiment and is connected to a DC bus 103 and will be explained in more detail with respect to the apparatuses 200, 300, of FIGS. 2-3. The stationary WPT device 104, in one embodiment, is connected to a three-phase AC power source 110, such as a power utility, a generator, a battery with an inverter or other source of AC electrical energy. The stationary WPT device 104 provides power to the mobile device 114 using a wireless power transfer technique. The three-phase AC power source 110 is an AC power source and includes a fundamental frequency. The fundamental frequency may be 60 hertz ("Hz"), which is found in many power systems in North America or elsewhere, 50 Hz, which is common in Europe, or other frequency, such as 400 Hz, which may be used in some aircraft systems and other systems. Other fundamental frequencies may be used. In addition, the AC power source 110 may be a single-phase AC power source.

Power from the three-phase AC power source 110 is conditioned by the resonant AC-to-DC converter 102 and the primary inverter 106 and is transmitted to the primary pad 108, which transfers power wirelessly to the secondary pad 116 of the mobile device 114. The stationary WPT device 104, in one embodiment, is ground mounted with the primary pad 108 flush with a roadway, a parking surface, a building floor, or other location. In another embodiment, the stationary WPT device 104 is located overhead and the mobile device 114 may move under the stationary WPT device 104 for wireless energy transfer.

In another embodiment, the stationary WPT device 104 is a device that may be plugged in and may be moved, but is intended primarily to be placed in a location while the mobile device 114 is intended to move after the wireless power transfer. For example, the mobile device 114 may include a mobile device load 120 with an energy storage device, such as a battery or other energy storage device and the stationary WPT device 104 may engage in a charging operation. In addition, the mobile device load 120 may include one or more additional loads, represented in FIG. 1 as a resistor, that are not energy storage devices, but that consume power transferred from the stationary WPT device 104 as power is wirelessly transferred to the mobile device 114. One of skill in the art will recognize other types of stationary WPT devices 104.

The mobile device 114, in one embodiment, is a device intended to be moved or to move itself using power from the stationary WPT device 104. For example, the mobile device 114 may be a vehicle that receives power from the stationary WPT device 104 and the stationary WPT device 104 is located where the mobile device 114 can drive over or under the primary pad 108. In another embodiment, the mobile device 114 is a consumer electronics device, such as a mobile phone, a music player, a tablet computer, and the like.

Typically, wireless power transfer requires a particular degree of alignment between the primary pad 108 and the secondary pad 116 for wireless power transfer to occur. While some wireless power transfer may occur for a low amount of alignment, typically it is desirable to have a particular amount of alignment and to meet a specified alignment tolerance prior to initiating wireless power transfer to increase efficiency. While alignment may be determined using sensors or other devices in addition to what is depicted in FIG. 1, a convenient way of determining alignment includes determining an amount of coupling between the primary pad 108 and the secondary pad 116. For example, a coupling coefficient associated with the primary pad 108 and the secondary pad 116 correlates to alignment of the primary pad 108 and the secondary pad 116. Transmitting a signal from the primary pad 108 to the secondary pad 116 may allow measurement of the signal at the secondary pad 116 to determine the coupling coefficient to determine an amount of alignment. In other embodiments, mechanical guides may be used for alignment.

The stationary WPT device 104, in one embodiment, includes a primary inverter 106 that converts power from the three-phase AC power source 110 to a state convenient for wireless power transfer. Waveforms from the stationary WPT device 104 typically include AC waveforms that are typically sinusoidal or include a fundamental sinusoidal waveform at a particular frequency and harmonic sinusoidal waveforms of the fundamental waveform. Typically, harmonics of the fundamental waveform are undesirable and are minimized as much as practical.

The primary inverter 106, in one embodiment, is a resonant inverter. Resonant inverters have been shown to be an efficient way to provide wireless power transfer. Other wireless power transfer techniques may also be used, including a typical inverter that generates a square waveform, which may or may not be further filtered to reduce harmonics. Where a resonant inverter is used, the resonant inverter may be of any number of resonant inverter (also called a resonant converter) topologies, such as a series resonant inverter, a parallel resonant inverter, a series parallel resonant converter, an inductor-capacitor-inductor ("LCL") load resonant inverter, and the like. In one embodiment, the primary inverter 106 includes one or more LCL load resonant inverter stages coupled to the primary pad 108, which is typically configured as an inductance.

The primary pad 108 of the stationary WPT device 104 is typically configured as an inductive device shaped to direct an electromagnetic field across a gap to the secondary pad 116 to electromagnetically couple with the secondary pad 116 with a degree of coupling that may be at least partially embodied using a coupling coefficient. Typically, the secondary pad 116 is also configured as an inductive device with a design to efficiently couple with the primary pad 108. Often primary and secondary pads are designed with coils that are planar or semi-planar.

The mobile device 114, in one embodiment, includes a secondary converter 118 that typically converts AC waveforms received at the secondary pad 116 to DC power to be used to charge a battery or other load of the mobile device load 120. The secondary converter 118, in one embodiment, is passive where changes in voltage, power, etc. of the stationary WPT device 104 control output power to the mobile device load 120. In another embodiment, the secondary converter 118 includes an active converter, such as a switchmode power converter. In another embodiment, the mobile device 114 includes other conditioning equipment that converts energy from the secondary pad 116 to an AC waveform for use by the mobile device 114 or for battery charging. For example, the mobile device 114 may include equipment that converts power from the secondary pad 116 to a 60 hertz ("Hz") AC waveform to be used by the mobile device 114. The mobile device 114 may then use the 60 Hz AC waveform for standard AC equipment and/or battery charging. In one embodiment, the secondary converter 118 includes a rectification circuit and a DC-to-DC converter to convert rectified DC power to another voltage.

In one example, the secondary converter 118 is designed to be bidirectional. For example, diodes in a typical secondary converter topology may be replaced with switching devices. In another embodiment, the mobile device 114 includes a unidirectional secondary converter 118. In one embodiment, the secondary converter 118 includes resonant elements, such as one or more additional inductors that are in addition to the secondary pad 116, and/or one or more additional capacitors. The rectification circuit, in one embodiment, is a full bridge rectifier. In another embodiment, the rectification circuit is a half bridge rectifier. In another embodiment, the rectification circuit includes an active rectification circuit that includes one or more switching devices.

In one embodiment, the system 100 includes a communications network 122 that may communicate between one or more stationary WPT devices 104, one or more mobile devices 114, and a control center 124. For example, the communications network 122 may communicate with the stationary WPT devices 104 via a computer network, via a radio network, a cellular network, and the like. The control center 124 may communicate with the stationary WPT devices 104 and mobile devices 114 and vice versa. In another embodiment, the system 100 does not include a control center 124.

Figure 2:
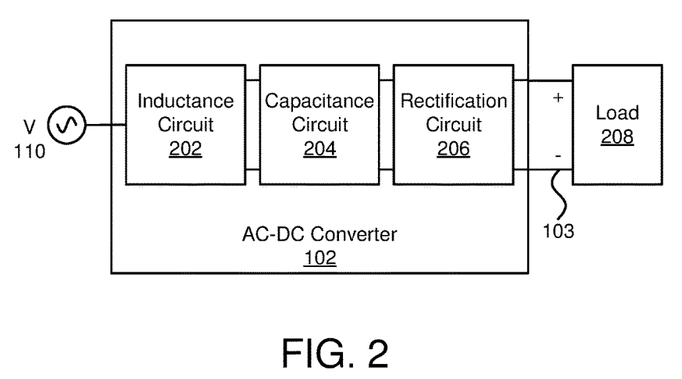
FIG. 2 is a schematic block diagram illustrating one embodiment of a resonant AC to DC converter.

FIG. 2 is a schematic block diagram illustrating one embodiment of a resonant AC to DC converter 102. The AC-to-DC converter 102 includes an inductance circuit 202, a capacitance circuit 204 and a rectification circuit 206 where the AC-to-DC converter 102 is connected to an AC power source 110 and to a DC bus 103 feeding a load 208. The components of the AC-to-DC converter 102 are described below.

The AC-to-DC converter 102 includes an inductance circuit 202 that receives power from the AC power source 110. In one embodiment, the inductance circuit 202 is a three-phase transformer. In other embodiments, the inductance circuit 202 is a single-phase transformer. The three-phase transformer may include multiple windings connected to a single magnetic core or may include three single-phase transformers. In one embodiment, the transformer is wye-wye connected. For example, one connection of each coil of a primary side of the transformer is connected to a three-phase AC power source 110 while the other connections of the primary side coils are connected together at a neutral connection. In other embodiments a transformer is not used, and instead the inductance circuit 202 is implemented with an inductor 303 for a single-phase or three-phase AC power source 110.

Note that as used herein, the term "neutral" for a three-phase transformer is used to convey the common connection point of the three windings in a wye-transformer and is not necessarily connected back to a three-phase AC power source 110. Similarly, on the secondary side, one connection to each secondary coil is an output phase connection while the other connection of the secondary coils is connected together as a secondary neutral connection. Using a wye-wye transformer is advantageous for conditions where the input power phases are imbalanced. The common connection point averages out the imbalance, creating lower ripple in a rectified output. In other embodiments, the inductance circuit 202 may be a delta-wye transformer, a wye-delta transformer, a delta-delta transformer, etc.

The inductance circuit 202, when a transformer, includes a turns ratio. For a typical transformer, the turns ratio causes an output voltage on the transformer to be different than the input voltage or an output current that is different than an input current. As used herein, voltage may be expressed as a root-mean-square ("rms") voltage. In other embodiments, voltage may be an instantaneous voltage. A ratio of the output voltage to the input voltage (typically rms voltage) is typically the turns ratio, which may also be called a voltage ratio, current ratio, or impedance ratio, depending on how the transformer is designed and what parameter is to be changed using transformer action. A turns ratio may be expressed as $n=N_2/N_1$ where $N_1$ is the number of coils on the primary side and $N_2$ is the number of coils on the secondary side. For a turns ratio (or voltage ratio) of $n=2=V_2/V_1$, so an input voltage $V_1$ of 100 volts ("V") would have a secondary voltage $V_2$ of 200 V. One of skill in the art will recognize other forms of a turns ratio.

Each phase of the transformer includes a leakage inductance. Typically, transformers include a leakage inductance as part of a leakage impedance. The leakage impedance may generally be modeled as an amount of resistance and an amount of leakage inductance. The resistance may be due to resistance of the coils of the transformer. The leakage inductance is generally due to magnetic flux that is not perfectly coupled through the magnetic core of the transformer to the secondary of the transformer.

The AC-to-DC converter 102 includes a capacitance circuit 204 that includes a capacitance for each phase. Each capacitance is connected between a phase and a neutral connection of a secondary of the transformer 202. The capacitance and the leakage inductance of the connected phase form a resonance with a particular resonant frequency.

Typically, leakage inductance is minimized in a transformer to reduce losses. In some embodiments, where the inductance circuit 202 is a transformer, the transformer is designed with a particular amount of leakage inductance to work with the capacitance of the capacitance circuit 204 to create a resonant frequency. The resonant frequency, in some embodiments, is near the fundamental frequency such that there is an amount of gain through the inductance circuit 202 and capacitance circuit 204 that is above the transformer turns ratio. For example, for an input line-to-line voltage of 480 V rms from the three-phase AC power source 110, the secondary voltage due to transformer action may be 500 V rms. Due to the resonant frequency, the secondary voltage of the transformer may be 550 V rms where the resonant frequency is close enough to the fundamental frequency of the three-phase AC power source 110 to increase gain across the transformer and capacitance circuit 204.

In some embodiments where the inductance circuit 202 is an inductor for each phase, gain of the resonant circuit formed by the inductance circuit 202 and capacitance circuit 204 causes a voltage at the input of the rectification circuit 206 to be above an input voltage of the AC power source 110 at the fundamental frequency of the AC power source 110. When the inductance circuit 202 is a transformer, the voltage gain from the AC power source 110 to the input of the rectification circuit 206 is a combination of the transformer turns ratio and the gain due to resonance between the transformer and capacitance circuit 204.

The AC-to-DC converter 102 includes a rectification circuit 206 connected to each phase of the secondary of the inductance circuit 202. The rectification circuit 206 rectifies an AC voltage present at the input of the rectification circuit 206 to a DC voltage to be supplied to the DC bus 103. Typically, the rectification circuit 206 includes diodes, switches, silicon-controlled rectifiers ("SCRs"), etc. to facilitate conversion of the AC voltage to a DC voltage. In one embodiment, the rectification circuit 206 includes a full-bridge rectifier. In another embodiment, the rectification circuit 206 includes a half-bridge rectifier. In another embodiment, the rectification circuit 206 includes a capacitor and/or inductor forming a low pass filter to filter out AC ripple. Other circuits may also be included in the rectification circuit 206, such as snubbers, Zener diodes, etc. to limit transients, reduce noise, etc. A passive rectification circuit 206 may be used to avoid introduction of harmonics that are typically present in the output voltage of an active rectification circuit to a greater degree than a passive rectification circuit 206.

The load 208 may be a computing system, a motor, a battery or other load that receives DC power. The resonant AC-to-DC converter 102 may be part of a system providing DC power to one or more components in the system. In one embodiment, as depicted in the system 100 of FIG. 1, the load may be a resonant converter 106 that may be used for wireless power transmission or for another purpose. One of skill in the art will recognize other loads for the resonant AC-to-DC converter 102.

Figure 3A:
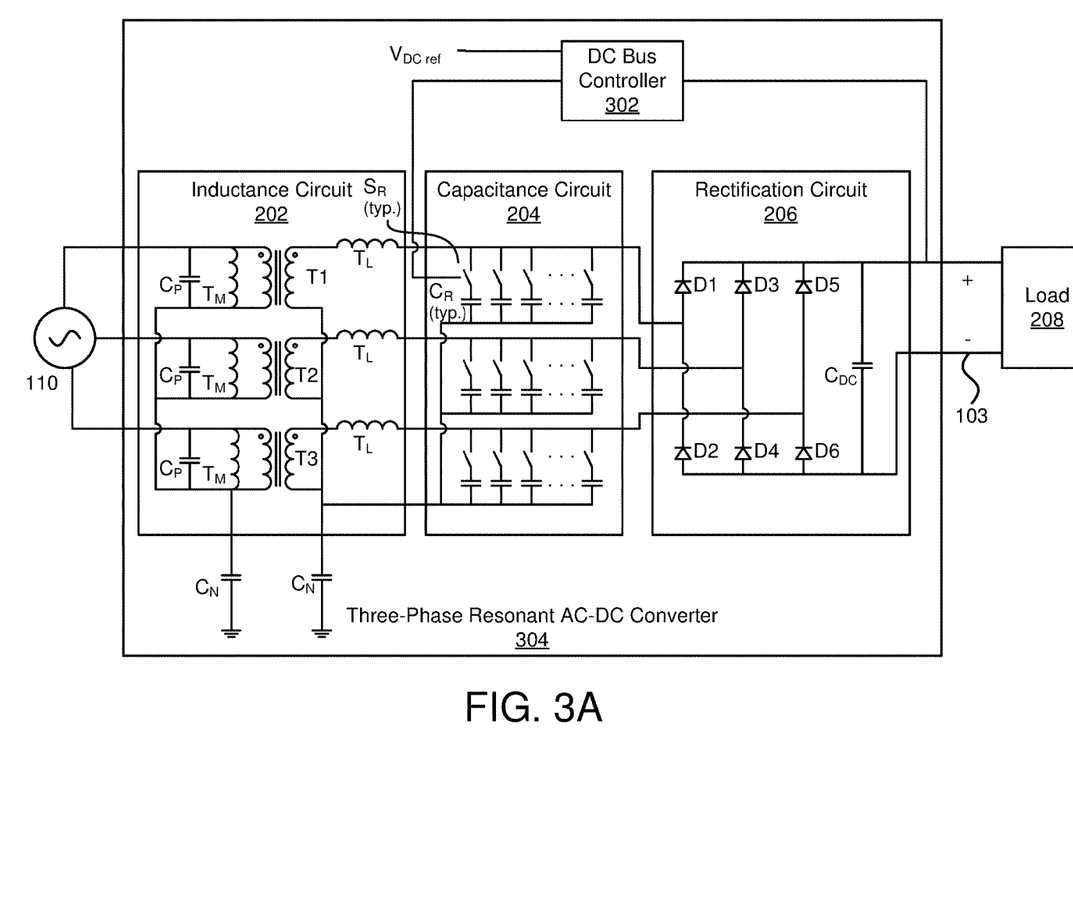
FIG. 3A is a schematic block diagram illustrating another embodiment of a three-phase resonant AC to DC converter.

FIG. 3A is a schematic block diagram illustrating another embodiment of a three-phase resonant AC to DC converter 304. The three-phase resonant AC-to-DC converter 304 is an isolated AC-to-DC converter and includes an inductance circuit 202 in the form of a transformer, a capacitance circuit 204 and a rectification circuit 206, which function similar to those described above, and additional functionality is described below.

The three-phase resonant AC-to-DC converter 304 includes an inductance circuit 202 that is depicted as three separate single-phase transformers, T1, T2 and T3. In other embodiments (not shown), the transformer includes a three-phase transformer. The single-phase transformers T1, T2, T3 are depicted with leakage inductance $T_L$, which would typically be the same or close to the same for each single-phase transformer T1, T2, T3. In one embodiment, the leakage inductances $T_L$ are from the single-phase transformers T1, T2, T3. In another embodiment, the leakage inductances $T_L$ include a small amount of leakage inductance from the transformers T1, T2, T3 plus added inductance. For example, design of the transformer may result in lower leakage inductances than a desired amount of inductance where addition of another inductance is sufficient to achieve a desired amount of leakage inductance.

The transformers T1, T2, T3 include magnetizing inductance $T_M$, which may be the same for each single-phase transformer T1, T2, T3 or may be slightly different. The single-phase transformers T1, T2, T3 are connected in a wye-wye configuration with capacitors $C_N$ connected between the neutral connections and ground. The transformers in the inductance circuit 202 may be designed to minimize magnetizing inductance, which often contributes to a lower power factor as seen from the input to the AC-to-DC converter 102 than if there was no magnetizing inductance $T_M$. A power factor correction capacitor $C_P$ may be added to change the power factor of the AC-to-DC converter 102. For example, the power factor correction capacitor $C_P$ may be sized based on the corresponding magnetizing inductance $T_M$ to correct power factor to above a desired value.

The three-phase resonant AC-to-DC converter 304 includes a capacitance circuit 204 that includes resonance capacitors $C_R$ that form a resonance with the leakage inductance $T_L$. Each resonance capacitor $C_R$ is in series with a switch $S_R$ that connects the associated resonance capacitor $C_R$ between a phase of the transformer in the inductance circuit 202 and the neutral connection of the secondary side of the transformers T1, T2, T3. A plurality of resonance capacitors $C_R$ are included and are switchable to vary the amount of capacitance of the capacitance circuit 204 to affect the resonant frequency formed by the leakage inductance $T_L$ and the capacitance of the capacitance circuit 204. Varying the capacitance of the capacitance circuit 204 affects the output voltage of the circuit formed by the inductance circuit 202 and the capacitance circuit 204.

The rectification circuit 206, in the embodiment of the AC-to-DC converter 102 depicted in FIG. 3A, includes a full-bridge rectifier that includes two diodes per phase of the AC power source 110. The diodes D1-D6 are connected to the DC bus 103 and rectify both positive and negative voltages present on the secondary side of the inductance circuit 202 and on the capacitance circuit 204. In the depicted embodiment, the rectification circuit 206 includes a capacitor $C_{DC}$ connected across the DC bus 103, which helps reduce ripple voltage on the DC bus 103. In other embodiments, the rectification circuit 206 may include a more complex filter to remove voltage ripple and may include other components, such as an inductance (not shown).

The three-phase resonant AC-to-DC converter 304, in one embodiment, includes a DC bus controller 302 that senses a DC output voltage of the rectification circuit 206 and controls the DC output voltage to a setpoint value $V_{DC\ ref}$ by connecting and disconnecting one or more capacitors $C_R$ of the capacitance circuit 204 by controlling the switches $S_R$. Note that only one control line to one switch is shown for clarity. For example, the DC bus controller 302 may open and close switches $S_R$ of the capacitance circuit 204 to add and remove resonance capacitors $C_R$ to adjust the resonant frequency of the AC-to-DC converter 102. Changing the resonant frequency adjusts the gain across the AC-to-DC converter 102 so that the voltage of the DC bus 103 will be raised and lowered. The voltage setpoint $V_{DC\ ref}$ of the DC bus controller 302 may be varied to change the voltage of the DC bus 103. The DC bus controller 302 may sense voltage of the DC bus 103 and may include a feedback loop. In one embodiment, the feedback loop is designed to prevent chatter of the switches $S_R$ or ripple caused by opening and closing the switches $S_R$ of the capacitance circuit 204 too often.

In one embodiment, the resonance capacitors $C_R$ for a phase of the inductance circuit 202 are different values to provide more possible combinations of capacitance for different resonant operating points, and hence more granular control of the voltage of the DC bus 103. For example, the resonance capacitors $C_R$ may have some large capacitors, some medium capacitors, some small capacitors, etc. to allow for a fine adjustment of capacitance of the capacitance circuit 204.

Figure 3B:
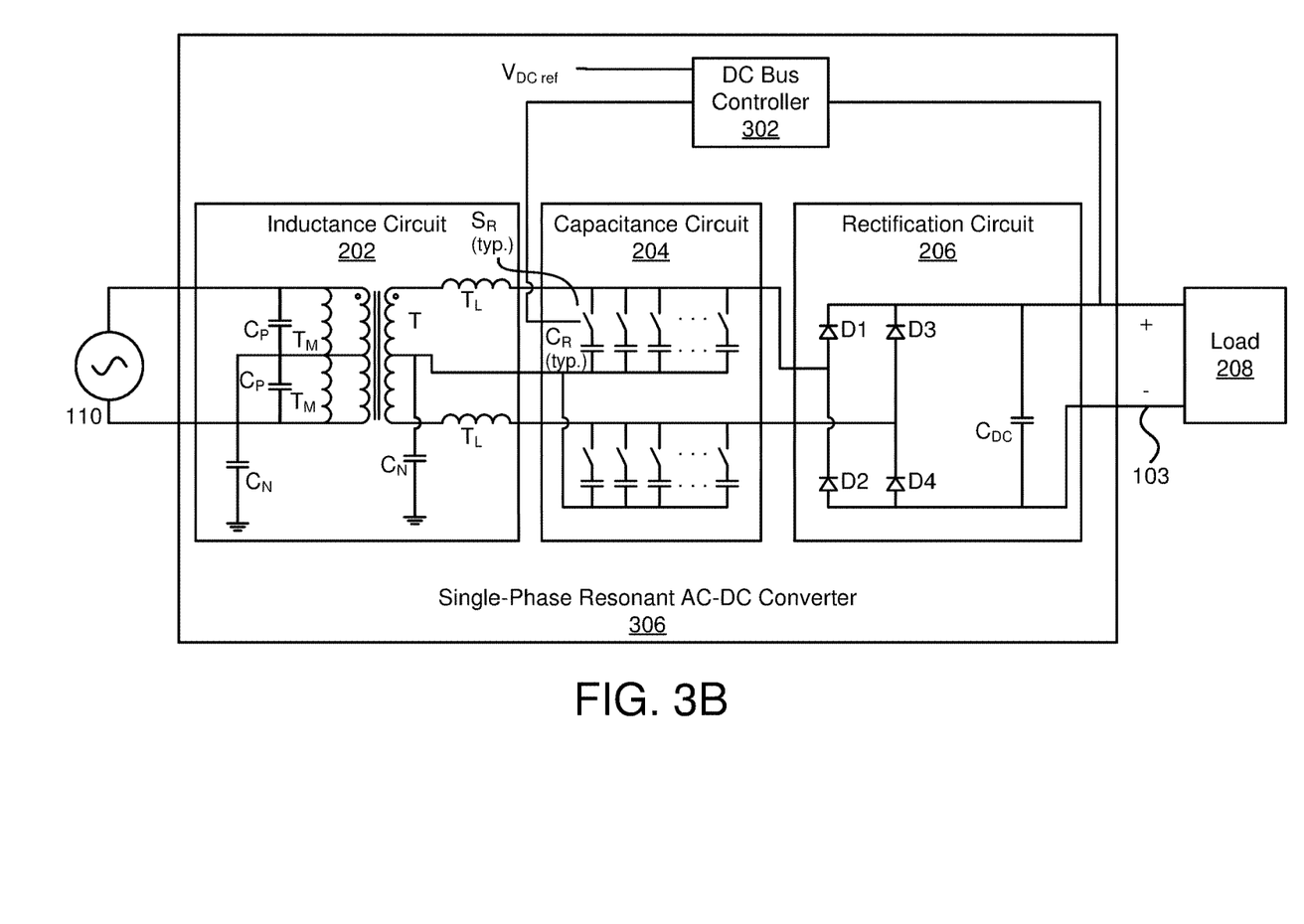
FIG. 3B is a schematic block diagram illustrating another embodiment of a single phase resonant AC to DC converter.

FIG. 3B is a schematic block diagram illustrating another embodiment of a single phase resonant AC to DC converter 306. The single-phase resonant AC-to-DC converter 306 functions similar to the three-phase resonant AC-to-DC converter 304 of FIG. 3A. The inductance circuit 202 is a single-phase transformer with a center-tap neutral. In other embodiments, the inductance circuit 202 may be a single-phase transformer without a center tap. The capacitance circuit 204 includes resonant capacitors $C_R$ and switches $S_R$ for each the two phases as depicted and the rectification circuit 206 includes a full-bridge rectifier as depicted with four diodes D1-D4. Typically, the second phase of the single-phase transformer in the inductance circuit 202 is 180 degrees out of phase with the first phase. One of skill in the art will recognize other variations for a single-phase resonant AC-to-DC converter 306.

Figure 3C:
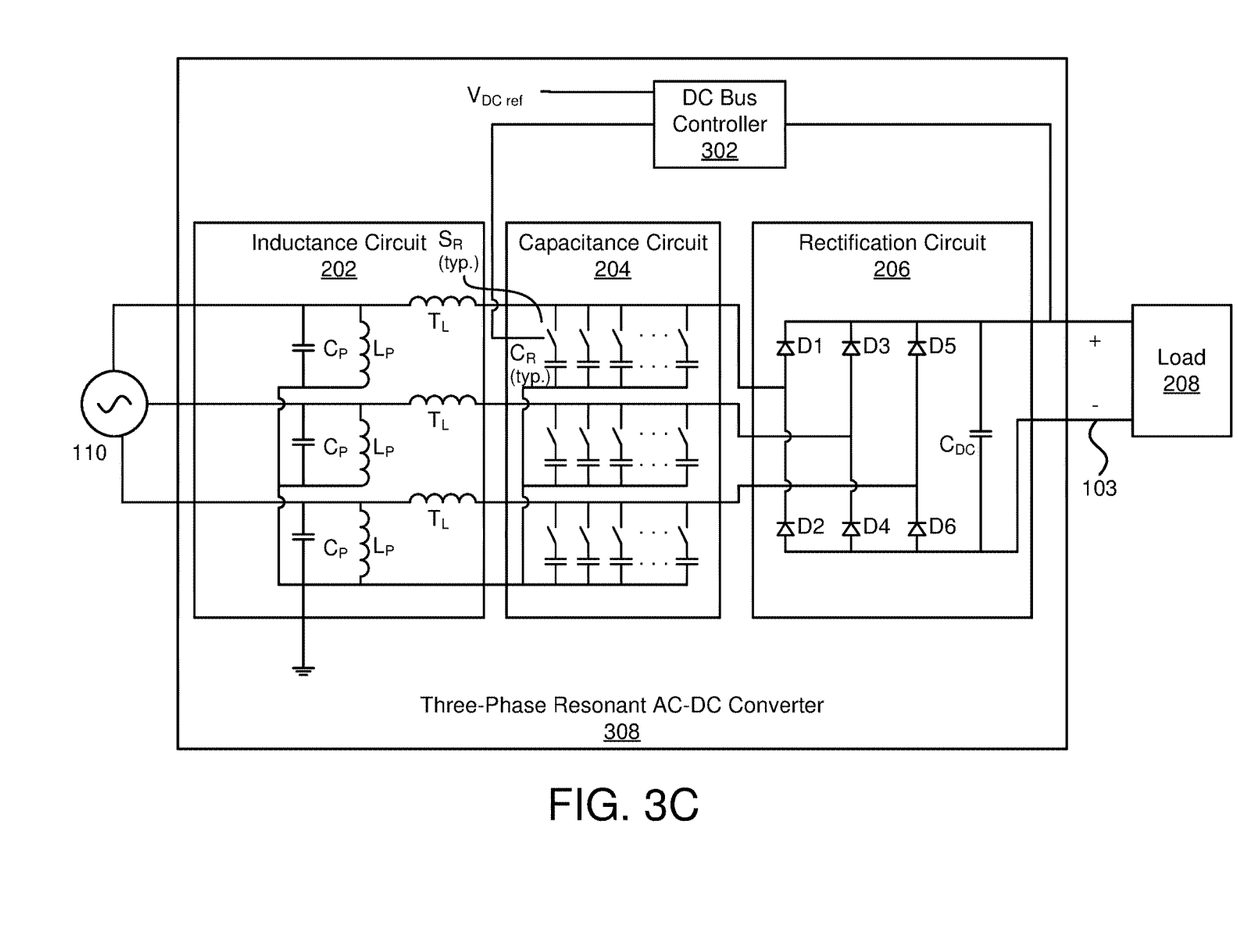
FIG. 3C is a schematic block diagram illustrating an embodiment of a three-phase resonant AC to DC converter without a transformer.

FIG. 3C is a schematic block diagram illustrating an embodiment of a three-phase resonant AC to DC converter 308 without a transformer. The inductance circuit 202 includes an inductor $T_L$ for each phase of the AC power source 110. (Note that the inductor is called $T_L$ instead of a symbol with an "L" even though the inductance is not a leakage inductance for consistency and convenience.) In some embodiments, each phase also includes a capacitor $C_P$ for power factor correction, as discussed above. Gain due to resonance between the inductance circuit 202 and capacitance circuit 204 is manifest at the input of the rectification circuit 206 where the fundamental frequency is close to the resonant frequency of the inductance circuit 202 and capacitance circuit 204. The gain is changed by changing capacitance of the capacitance circuit 204 to modify the resonant frequency. Thus, gain is not a function of a turns ratio of a transformer. The embodiment of the AC-to-DC converter 308 depicted in FIG. 3C does not include isolation between the input and the output of the AC-to-DC converter 308.

The embodiment of the AC-to-DC converter 308 depicted in FIG. 3C includes a power factor correction capacitor CP and a power factor correction inductor LP. Typically, either the capacitor CP or inductor LP is included as needed, depending on whether or not a power factor of the load 120, 208 and/or AC-to-DC converter 102 is leading or lagging, to correct the power factor.

Figure 4:
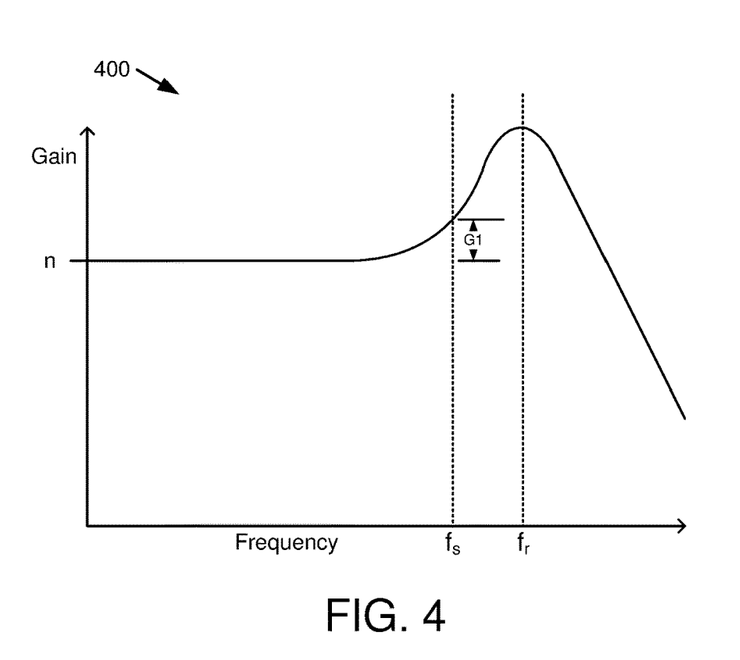
FIG. 4 is a frequency response of one embodiment of a resonant AC to DC converter.

FIG. 4 is a frequency response 400 of one embodiment of a resonant AC-to-DC converter 102. The frequency response 400 has gain on the vertical axis and frequency on the horizontal axis, which may be a logarithmic scale. The frequency response 400 is flat at lower frequencies and the gain may be due to transformer action so the gain is the turns ratio n. As the frequency approaches the resonant frequency $f_r$, the gain increases to a peak and then decreases. At the fundamental frequency $f_s$ of the three-phase AC power source 110, the gain is G1 so that as the three-phase AC power source 110 introduces AC voltages at the fundamental frequency $f_s$, voltage across the AC-to-DC converter 102 is higher than just the turns ratio n.

Figure 5:
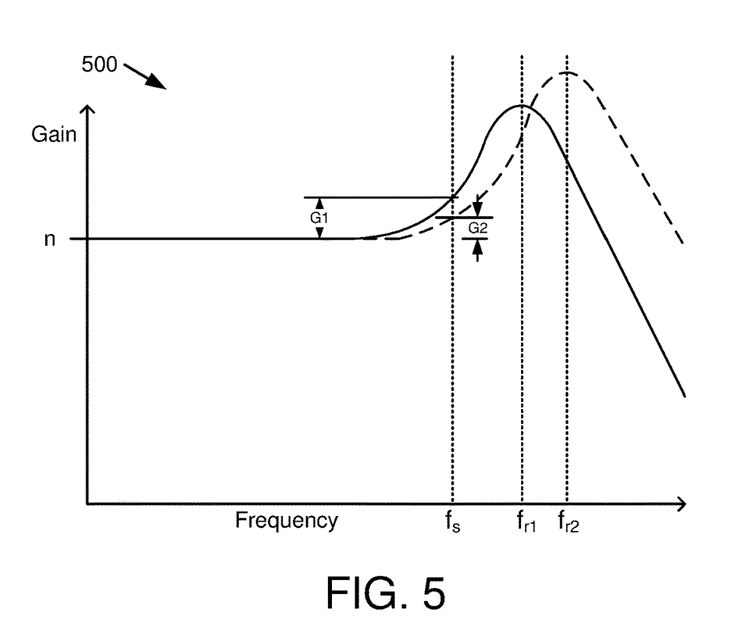
FIG. 5 includes two frequency responses for different resonant frequencies for an embodiment of a resonant AC to DC converter.

FIG. 5 includes two frequency responses for different resonant frequencies for an embodiment of a resonant AC to DC converter 102. The frequency response 500 includes a first response represented by a solid line with a first resonant frequency $f_{r1}$. The frequency response also includes a second response for a second resonant frequency $f_{r2}$ represented by a dashed line. Note that while the second resonant frequency $f_{r2}$ has a higher overall gain, the gain G2 at the fundamental frequency $f_s$ is lower than the gain G1 for the first resonant frequency $f_{r1}$. Other resonant frequencies and gains at the fundamental frequency $f_s$ are possible based on the number and size of the resonant capacitors $C_r$.

The DC bus controller 302 may determine that output voltage of the DC bus 103 is below a setpoint. The DC bus controller 302 opens and/or closes switches $S_R$ of the capacitance circuit 204 to change capacitance, and this change the resonant frequency $f_r$ of the converter 304. Changing the resonant frequency $f_r$ also changes the gain at the fundamental frequency $f_s$, which changes the output voltage of the capacitance circuit 204, which then changes the voltage of the DC bus 103. For example, if the resonant frequency is $f_{r1}$, the gain may be G1. The load 208 may decrease so that the voltage of the DC bus 103 may rise. The DC bus controller 302 may then open and/or closes switches $S_R$ of the capacitance circuit 204 to change the resonant frequency to $f_{r2}$, which decreases the gain to G2, which decreases the voltage of the DC bus 103.

Figure 6:
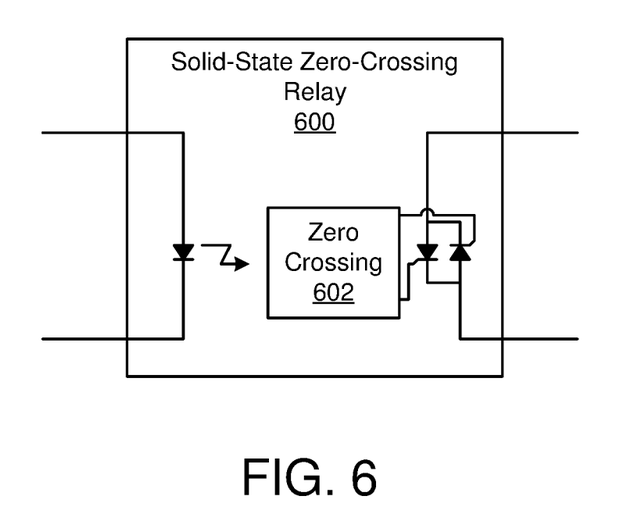
FIG. 6 is a schematic block diagram of a solid-state relay with a zero-voltage detection circuit.

FIG. 6 is a schematic block diagram of a solid-state relay 600 with a zero-crossing detection circuit 602. The solid-state relay 600 may be used as a switch $S_R$ for the capacitance circuit 204. The solid-state relay 600 may include input terminals for control, as depicted on the left, with a control circuit, such as an opto-coupler, which closes semiconductor switches, such as the depicted back-to-back silicon-controlled rectifiers ("SCRs"). The zero-crossing detection circuit 602 may detect zero voltage across the semiconductor switches and may then close with no voltage or a small voltage across the switches. For example, voltage on the input may command the switches closed so at the next zero-voltage crossing the zero-crossing detection circuit 602 commands the switches closed. Likewise, voltage on the input may command the switches opened so at the next zero-voltage crossing the zero-crossing detection circuit 602 commands the switches open. Opening and closing at or near the zero-voltage crossing typically introduces less harmonics on the AC-to-DC converter 102 and reduces inrush current problems on the resonance capacitors $C_R$ of the capacitance circuit 204.

The AC-to-DC converter 102 described herein is advantageous because the AC-to-DC converter 102 is more reliable than switching AC-to-DC converters. In addition, because there is no high frequency switching, total harmonic distortion ("THD") and harmonics caused by the switching is less than switching AC-to-DC converters. Traditional power factor correction capacitors $C_P$ may be added as necessary to provide a high power factor. Reliability is typically higher than switching AC-to-DC converters because most of the components are passive and the switches $S_R$ are opened and closed on a less frequent basis than switching AC-to-DC converters. The AC-to-DC converter 102 is also highly efficient because harmonics are not present and then filtered out, as is the case for switching AC-to-DC converters. The AC-to-DC converter 102 presented herein also has relatively low electromagnetic interference ("EMI") due to a low amount of harmonics present in the AC-to-DC converter 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an inductance circuit comprising an inductor with a first end connected in series with each phase of an alternating current ("AC") power source comprising a fundamental frequency;
   a capacitance circuit comprising a capacitance for each phase, each capacitance connected in parallel between a second end of the inductor of a phase and a neutral connection, the capacitance and the inductor of the connected phase forming a resonant frequency; and
   a rectification circuit comprising an input and an output, the input connected, for each phase, in series with the second end of the inductor of the phase,
   wherein the resonant frequency is related to the fundamental frequency to provide a gain at the fundamental frequency, the gain boosting a voltage of the input to the rectification circuit at the fundamental frequency above an output voltage of the AC source.

2. The apparatus of claim 1, wherein the inductance circuit comprises a transformer with a primary side connected to each phase of the AC power source, the transformer comprising a leakage inductance for each phase, wherein the capacitance circuit is connected between a secondary of the transformer and the neutral connection of the secondary of the transformer and wherein the gain at the resonant frequency boosts the secondary voltage of the transformer at the fundamental frequency above a secondary voltage of the transformer resulting from a turns ratio of the transformer.

3. The apparatus of claim 2, wherein the leakage inductance comprises one or more of a leakage inductance of the transformer and an inductance in series with each phase, wherein a design of each transformer is chosen to achieve a desired amount of leakage inductance of the transformer.

4. The apparatus of claim 2, further comprising a magnetizing inductance of the transformer, the magnetizing inductance manifest as an inductance for each phase of the transformer connected between each phase of a primary side of the transformer and a neutral of the primary of the transformer, wherein a design of the transformer is chosen to achieve a desired amount of magnetizing inductance of the transformer to achieve a power factor.

5. The apparatus of claim 4, further comprising a power factor capacitor for each phase of the transformer connected between each phase of a primary side of the transformer and a neutral of the primary of the transformer, each power factor capacitor chosen to achieve a desired power factor.

6. The apparatus of claim 2 wherein the transformer comprises a three-phase, wye-wye connected transformer.

7. The apparatus of claim 2 wherein the transformer comprises three single-phase transformers connected to a common neutral, the common neutral comprising the neutral connection.

8. The apparatus of claim 1, wherein the capacitance circuit comprises a variable capacitance for each phase, wherein varying the capacitances of the capacitance circuit adjusts the gain of the input voltage of the rectification circuit at the fundamental frequency.

9. The apparatus of claim 8, wherein the capacitance circuit comprises a plurality of capacitors for each phase and the capacitance circuit varies the capacitance by connecting and disconnecting one or more capacitors of the plurality of capacitors of a phase, each connected capacitor connected between the second end of the inductor of a phase and the neutral connection of the secondary.

10. The apparatus of claim 9, wherein each capacitor comprises a switch connected in series with the capacitor, each switch controllable to connect and disconnect the capacitor.

11. The apparatus of claim 10, wherein each switch comprises a zero-voltage detection circuit, wherein when a switch is commanded closed, the switch closes in response to the zero-voltage detection circuit indicating a zero voltage.

12. The apparatus of claim 11, wherein the switch comprises a solid-state relay with a zero-voltage detection circuit.

13. The apparatus of claim 9, further comprising a direct current ("DC") bus controller that senses a DC output voltage of the rectification circuit and controls the DC output voltage to a setpoint value by connecting and disconnecting one or more capacitors of the capacitance circuit.

14. The apparatus of claim 9, wherein the plurality of capacitors comprises a plurality of sizes of capacitors.

15. The apparatus of claim 1, wherein the resonant frequency is a frequency above the fundamental frequency and wherein adjusting capacitance of the capacitance circuit varies the resonant frequency such that a gain at the fundamental frequency changes as the resonant frequency changes.

16. An apparatus comprising:
    an inductance circuit with an inductor connected in series with each phase of an alternating current ("AC") power source comprising a fundamental frequency;
    a capacitance circuit comprising a variable capacitance for each phase, each capacitance connected in parallel between a second end of the inductor of a phase and a neutral connection, the capacitance and the inductor of the connected phase forming a resonant frequency, wherein varying the capacitances of the capacitance circuit adjusts the gain of the secondary voltage at the fundamental frequency; and
    a rectification circuit comprising an input and an output, the input connected, for each phase, in series with the second end of the inductor of the phase,
    wherein the resonant frequency is above the fundamental frequency and provides a gain at the fundamental frequency, the gain boosting a voltage of the input to the rectification circuit at the fundamental frequency above an output voltage of the AC source, wherein adjusting capacitance of the capacitance circuit varies the resonant frequency such that a gain at the fundamental frequency changes as the resonant frequency changes.

17. The apparatus of claim 16, wherein the capacitance circuit comprises a plurality of capacitors for each phase and the capacitance circuit varies the capacitance by connecting and disconnecting one or more capacitors of the plurality of capacitors of a phase, each connected capacitor connected in parallel between a second end of the inductor of a phase and the neutral connection.

18. The apparatus of claim 17, wherein each capacitor comprises a switch connected in series with the capacitor, each switch controllable to connect and disconnect the capacitor.

19. The apparatus of claim 18, wherein each switch comprises a zero-voltage detection circuit, wherein when a switch is commanded closed, the switch closes in response to the zero-voltage detection circuit indicating a zero voltage.

20. The apparatus of claim 16, wherein the inductance circuit comprises a transformer with a primary side connected to each phase of the AC power source, the transformer comprising a leakage inductance for each phase, wherein the capacitance circuit is connected between a secondary of the transformer and the neutral connection of the secondary of the transformer and wherein the gain at the resonant frequency boosts the secondary voltage of the transformer at the fundamental frequency above a secondary voltage of the transformer resulting from a turns ratio of the transformer.

21. The apparatus of claim 20, further comprising
a magnetizing inductance of the transformer, the magnetizing inductance manifest as an inductance for each phase of the transformer connected between each phase of a primary side of the transformer and a neutral of the primary of the transformer, wherein a design of the transformer is chosen to achieve a desired amount of magnetizing inductance of the transformer to achieve a power factor; and
a power factor capacitor for each phase of the transformer connected between each phase of a primary side of the transformer and a neutral of the primary of the transformer, each power factor capacitor chosen to achieve a desired power factor.

22. An apparatus comprising:
a transformer with a primary connected to an alternating current ("AC") power source comprising a fundamental frequency, each phase of the transformer comprising an inductance comprising one or more of a leakage inductance of the transformer and a series inductance in series with each phase;
a capacitance circuit comprising a plurality of capacitors and switches for each phase of the transformer, each capacitor connected in series with a switch and each capacitor and series switch connected between a phase and a neutral connection of a secondary of the transformer, capacitance of connected capacitors of a phase and the inductance of the phase forming a resonant frequency, wherein varying the capacitances of the capacitance circuit adjusts the gain of the secondary voltage at the fundamental frequency, wherein each switch comprises a zero-voltage detection circuit and when a switch is commanded closed, the switch closes in response to the zero-voltage detection circuit indicating a zero voltage;
a rectification circuit connected to each phase of the secondary of the transformer; and
a direct current ("DC") bus controller that senses a DC output voltage of the rectification circuit and controls the DC output voltage to a setpoint value by connecting and disconnecting one or more capacitors of the capacitance circuit,
wherein the resonant frequency is above the fundamental frequency and provides a gain at the fundamental frequency, the gain boosting a secondary voltage of the transformer at the fundamental frequency above a secondary voltage resulting from a turns ratio of the transformer, wherein adjusting capacitance of the capacitance circuit varies the resonant frequency such that a gain at the fundamental frequency changes as the resonant frequency changes.

* * * * *